(12) United States Patent  (10) Patent No.: US 9,104,076 B2
Son                        (45) Date of Patent:    Aug. 11, 2015

(54) LIQUID CRYSTAL DISPLAY

(75) Inventor: Yang-Han Son, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 40 days.

(21) Appl. No.: 13/352,438

(22) Filed: Jan. 18, 2012

(65) Prior Publication Data

US 2013/0070181 A1 Mar. 21, 2013

(30) Foreign Application Priority Data

Sep. 16, 2011 (KR) ........................ 10-2011-0093663

(51) Int. Cl.
G02F 1/1345 (2006.01)
G02F 1/1335 (2006.01)

(52) U.S. Cl.
CPC ........ *G02F 1/1345* (2013.01); *G02F 1/133615* (2013.01); *G02F 2001/133612* (2013.01)

(58) Field of Classification Search
CPC .......................... G02F 1/133615; G02F 1/1345
USPC ...................................................... 349/150
See application file for complete search history.

(56) References Cited

U.S. PATENT DOCUMENTS

2005/0269603 A1* 12/2005 Kang ............................. 257/291
2006/0098392 A1* 5/2006 Sakurai ........................ 361/520
2008/0062109 A1* 3/2008 Kim et al. ........................ 345/92
2008/0076273 A1* 3/2008 Jang ................................. 439/56
2008/0192505 A1* 8/2008 Park ............................... 362/615
2009/0185393 A1* 7/2009 Kang et al. ..................... 362/612
2010/0123160 A1* 5/2010 Hatano et al. ................... 257/99
2011/0102726 A1* 5/2011 Nobeoka et al. .............. 349/150
2011/0157512 A1* 6/2011 Mishima ........................ 349/58

FOREIGN PATENT DOCUMENTS

JP      2010-231145        10/2010
KR   10-2008-0060615 A     7/2008
KR   10-2008-0064733 A     7/2008
KR      10-0876248 B1     12/2008
KR   10-2010-0033864 A     3/2010
KR   10-2011-0022971 A     3/2011

* cited by examiner

*Primary Examiner* — Michael Caley
*Assistant Examiner* — Edmond Lau
(74) *Attorney, Agent, or Firm* — Lee & Morse, P.C.

(57) ABSTRACT

A liquid crystal display includes: a liquid crystal display panel; a backlight unit including a light emitting diode; a first flexible printed circuit having first and second end portions and a bent portion, the first end portion of the first flexible printed circuit connected to the liquid crystal display panel; a second flexible printed circuit having first and second end portions, and a bent portion, the first end portion of the second flexible printed circuit coupled with the light emitting diode and a second end portion of the second flexible printed circuit connected to the first flexible printed circuit; an anisotropic conductive film connecting the first flexible printed circuit and the second flexible printed circuit; and a case including a recess portion at rear surface, the second end portion of the second flexible printed circuit is within the recess portion.

12 Claims, 4 Drawing Sheets

LIQUID CRYSTAL DISPLAY

RELATED APPLICATIONS

This application claims priority to and the benefit of Korean Patent Application No. 10-2011-0093663 filed in the Korean Intellectual Property Office on Sep. 16, 2011, the entire contents of which are incorporated herein by reference.

BACKGROUND

1. Field

The embodiments relate generally to a liquid crystal display (LCD).

2. Description of the Related Art

A liquid crystal display (LCD) is a display device for displaying images by using a liquid crystal layer functioning as a shutter.

A conventional liquid crystal display (LCD) includes a display panel including a liquid crystal layer, a backlight unit for irradiating light to the display panel, and a reception member for receiving the display panel and the backlight unit.

As a light source of the backlight unit, a light emitting diode (LED), a cold cathode fluorescent lamp (CCFL), or an external electrode fluorescent lamp (EEFL) may be used.

Among them, the LED as a point light source, is generally used in the liquid crystal display (LCD). The LED is mounted to a flexible printed circuit board (FPCB) liquid crystal display (LCD) that is advantageous in forming the thin liquid crystal display (LCD) to be used in a liquid crystal display (LCD) device.

The flexible printed circuit (FPC) that is mounted with the LED may be connected to a main flexible printed circuit (FPC) on which driving circuits, such as a gate driver, a data driver, and a timing controller to drive the liquid crystal display panel are mounted through soldering. However, the main flexible printed circuit (FPC) and the flexible printed circuit (FPC) mounted with the LED may be soldered at a portion that is convex.

The above information disclosed in this Background section is only for enhancement of the understanding of the background of the described technology, and therefore, it may contain information that does not form the prior art that is already known in this country to a person of ordinary skill in the art.

SUMMARY

One or more embodiments may provide a liquid crystal display (LCD), including: a liquid crystal display panel; a backlight unit irradiating light to the liquid crystal display panel, the backlight unit including a light emitting diode; a first flexible printed circuit (FPC) having first and second end portions, and a bent portion between the first and second end portions, the first end portion of the first flexible printed circuit (FPC) being connected to the liquid crystal display panel, the first flexible printed circuit (FPC) driving the liquid crystal display panel and the light emitting diode; a second flexible printed circuit (FPC) having first and second end portions, and a bent portion extending between the first and second end portions, the first end portion of the second flexible printed circuit (FPC) being coupled with the light emitting diode and the second end portion of the second flexible printed circuit (FPC) being connected to the first flexible printed circuit (FPC); an anisotropic conductive film connecting the first flexible printed circuit (FPC) and the second flexible printed circuit (FPC); and a case receiving at least a portion of the backlight unit and the liquid crystal display panel, the case including a rear surface having a recess portion, the second end portion of the second flexible printed circuit (FPC) is positioned within the recess portion.

The second end portion of the second flexible printed circuit (FPC) may be positioned between the rear surface of the case and the first flexible printed circuit (FPC).

The anisotropic conductive film may be positioned between the second end portion of the first flexible printed circuit (FPC) and the second end portion of the second flexible printed circuit (FPC). The anisotropic conductive film may be positioned at the recess portion. The anisotropic conductive film and the second end portion of the second flexible printed circuit (FPC) may be positioned within the recess portion.

The first flexible printed circuit (FPC) and the second flexible printed circuit (FPC) may each include a flexible insulating film and a complex circuit formed on the flexible insulating film. The flexible insulating film may include a heat resistant plastic film. The heat resistant plastic film may include polyethylene terephthalate (PET) or polyimide (PI). The first flexible printed circuit (FPC) may include driving circuits for driving the liquid crystal display panel and driving circuits for driving the light emitting diodes. The driving circuits for driving the liquid crystal display panel may include at least one of a gate driving circuit, a data driving circuit, and a timing controller.

DETAILED DESCRIPTION

Figure 1:
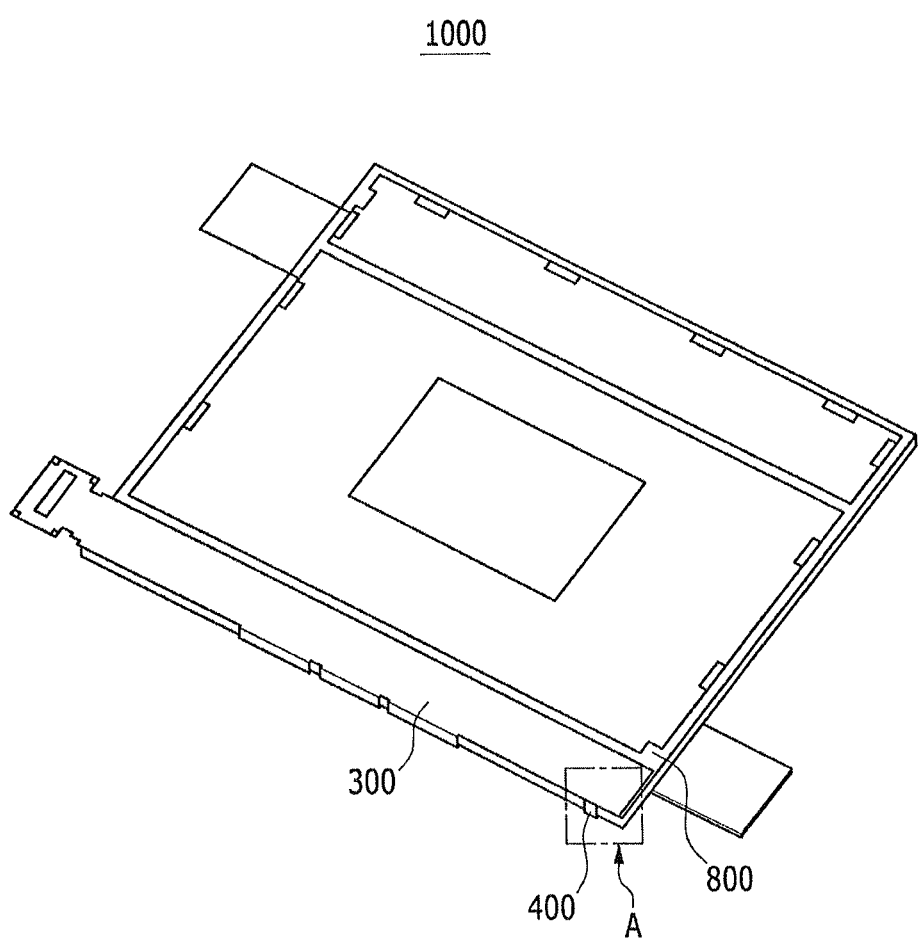
FIG. 1 illustrates a view of a rear surface of a liquid crystal display (LCD) according to an exemplary embodiment.

The embodiments will be described more fully hereinafter with reference to the accompanying drawings, in which exemplary embodiments are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

In addition, the size and thickness of each component shown in the drawings are arbitrarily shown for understanding and ease of description, but the embodiments are not limited thereto.

In the drawings, the thickness of layers, films, panels, regions, etc., are exaggerated for clarity. In addition, in the drawings, for understanding and ease of description, the thicknesses of some layers and areas are exaggerated. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. Further, throughout the specification, "on" implies being positioned above or below a target element and does not imply being necessarily positioned on the top on the basis of a gravity direction.

Next, a liquid crystal display (LCD) 1000 according to an exemplary embodiment will be described with reference to FIG. 1 to FIG. 4.

Figure 2:
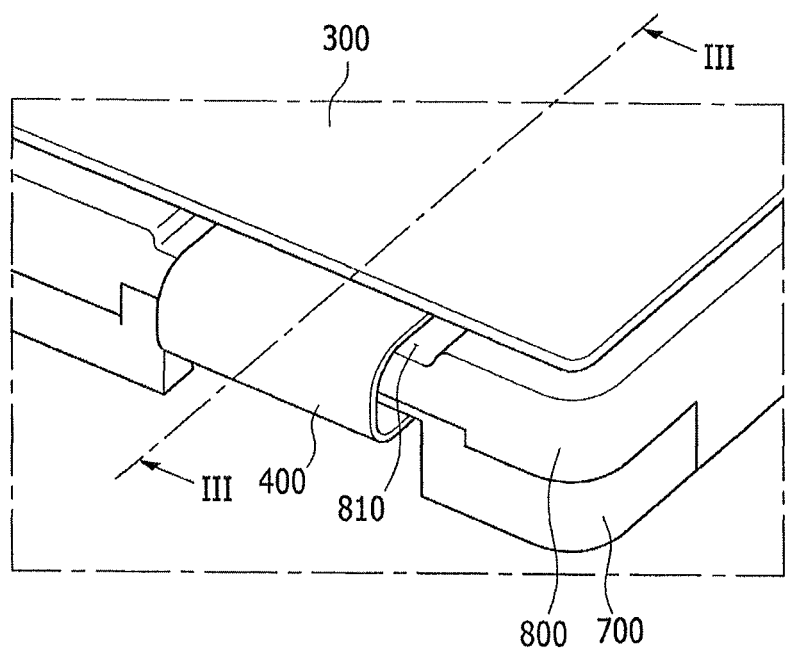
FIG. 2 illustrates an enlarged view of a portion A of FIG. 1.
Figure 3:
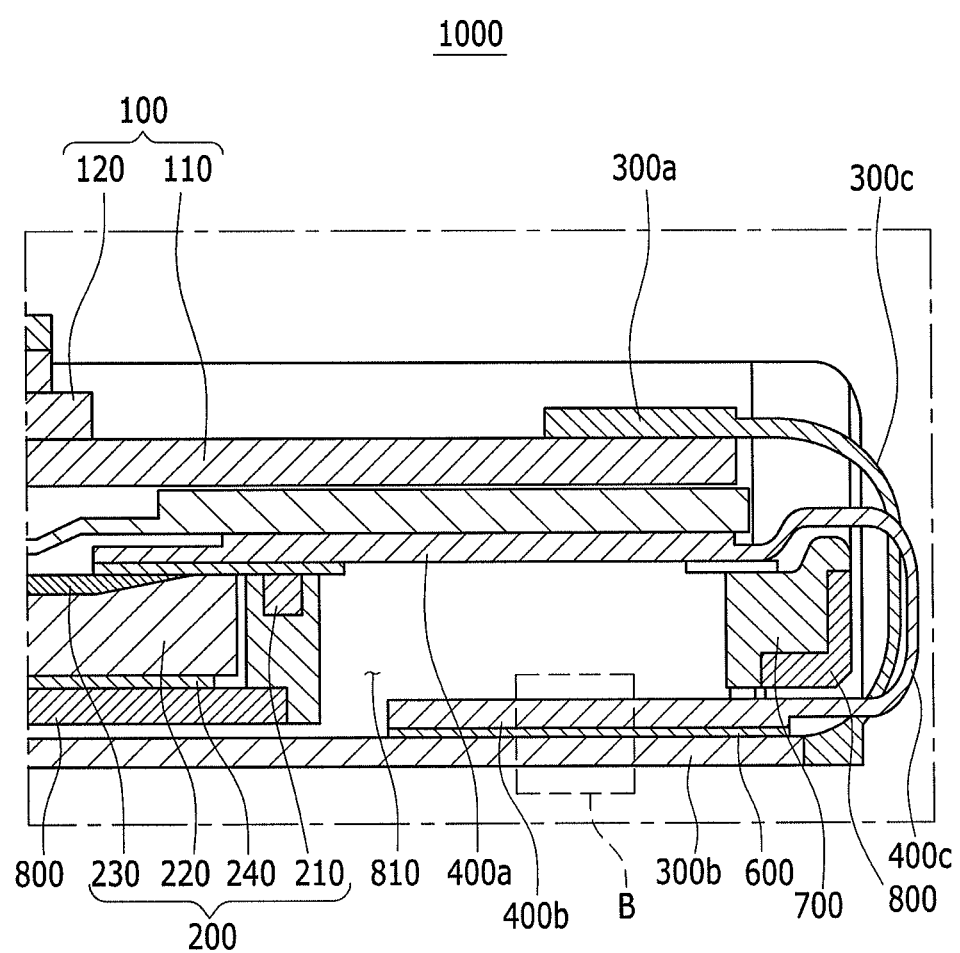
FIG. 3 illustrates a cross-sectional view taken along the line of FIG. 2.

FIG. 1 illustrates a view of a rear surface of a liquid crystal display (LCD) according to an exemplary embodiment. FIG. 2 illustrates a view of a portion A of FIG. 1. FIG. 3 illustrates a cross-sectional view taken along the line of FIG. 2.

As shown in FIG. 1 to FIG. 3, a liquid crystal display (LCD) 1000, according to an exemplary embodiment, may include a liquid crystal display panel 100, a backlight unit 200, a first flexible printed circuit (FPC) 300, a second flexible printed circuit (FPC) 400, an anisotropic conductive film 600, a mold frame 700, and a case 800.

The liquid crystal display panel 100 may display an image by using light emitted from the backlight unit 200 through a liquid crystal layer (not shown). The liquid crystal display panel 100 may include a first substrate 110 and a second substrate 120 facing each other, and a liquid crystal layer (not shown) may be positioned between the first substrate 110 and the second substrate 120. At least one of the first substrate 110 and the second substrate 120 may include wires, and liquid crystals may be moved by a magnetic field generated by the wires, such that the quantity of light irradiated to the display panel 100 from the backlight unit 700 may be controlled to display an image on the display panel 100. A polarizer that converts an optical axis of light irradiated to the display panel 100 or emitted to the outside through the display panel 100 may be attached to the front surface and the rear surface of the display panel 100. The first flexible printed circuit (FPC) 300, on which a driver supplying a driving signal to the liquid crystal display panel 100 is mounted, may be attached to the liquid crystal display panel 100.

The backlight unit 200 may include a plurality of light emitting diodes 210 disposed at one side, a light guide plate 220 that converts a point light source of the light emitting diode 210 into a surface light source, an optical sheet 230 disposed on the light guide plate 220 that diffuses and collects the light, and a reflection sheet 240 disposed at the lower surface of the light guide plate 220 that reflects the light emitted from the lower surface of the light guide plate 220 in the direction of the light guide plate 220.

The light emitting diode 210 may be formed by a combination of a white light emitting diode emitting white light, or red, green, and blue light emitting diodes emitting red light, green light, and blue light, respectively, and may be mounted on a surface of the second flexible printed circuit (FPC) 400.

The first flexible printed circuit (FPC) 300 may be a circuit board including a flexible insulating film and complex circuits formed thereon. The flexible insulating film may include a heat resistant plastic film, such as polyethylene terephthalate (PET) or polyimide (PI).

Driving circuits used for driving the liquid crystal display panel 100 and driving circuits for driving the light emitting diodes 210 may be mounted on a surface of the first flexible printed circuit (FPC) 300. The driving circuits used for driving the liquid crystal display panel may include, for example, a gate driving circuit, a data driving circuit, and a timing controller. In an implementation, the first flexible printed circuit (FPC) 300 for driving the liquid crystal display panel 100 and the light emitting diodes 210 may be connected to the liquid crystal display panel 100 at a first end portion 300*a*. The first flexible printed circuit (FPC) 300 may include a second end portion 300*b* that extends along a rear surface of the case 800 and a bent portion 300*c* that extends between the first and second end portions, e.g., in a direction perpendicular to the direction in which the first and second end portions extend.

The second flexible printed circuit (FPC) 400 may be a circuit board including the complex circuit formed on a flexible insulating film. The flexible insulating film may include a heat resistance plastic film, such as, polyethylene terephthalate (PET) or polyimide (PI). The second flexible printed circuit (FPC) 400 may include the light emitting diodes 210 mounted on a surface thereof. In an implementation, the second flexible printed circuit (FPC) 400 may be coupled to the light emitting diodes 210 at a first end portion 400*a*. The light emitting diodes 210 mounted on a surface of the second flexible printed circuit (FPC) 400 may be connected to the first flexible printed circuit (FPC) 300 by the anisotropic conductive film 600 that extends along the rear surface of the case 800. The second flexible printed circuit (FPC) 400 may include a second end portion 400*b* that extends along a rear surface of the case 800 and a bent portion 400*c* that extends between the first and second end portions, e.g., in a direction perpendicular to the direction in which the first and second end portions extend. The second flexible printed circuit (FPC) 400 may be positioned between the rear surface of the case 800 and the first flexible printed circuit (FPC) 300.

A recess portion 810 may be formed at the rear surface of the case 800. A portion of the second flexible printed circuit (FPC) 400 may be positioned at an inner side, e.g., within the recess portion 810, of the case 800. For example, a portion, i.e., the second end portions 300*b*, 400*b*, of the first flexible printed circuit (FPC) 300 and the second flexible printed circuit (FPC) 400, respectively, may be connected via the anisotropic conductive film 600 at the recess portion 810 that is at the rear surface of the case 800. In an implementation, the second end portion 400*b* of the second flexible printed circuit (FPC) 400 and the anisotropic conductive film 600 may be positioned inside, e.g., within the recess portion 810 in the rear surface of the case 800. Accordingly, the liquid crystal display (LCD) 1000 may achieve a slim, i.e., compact, form.

Figure 4:
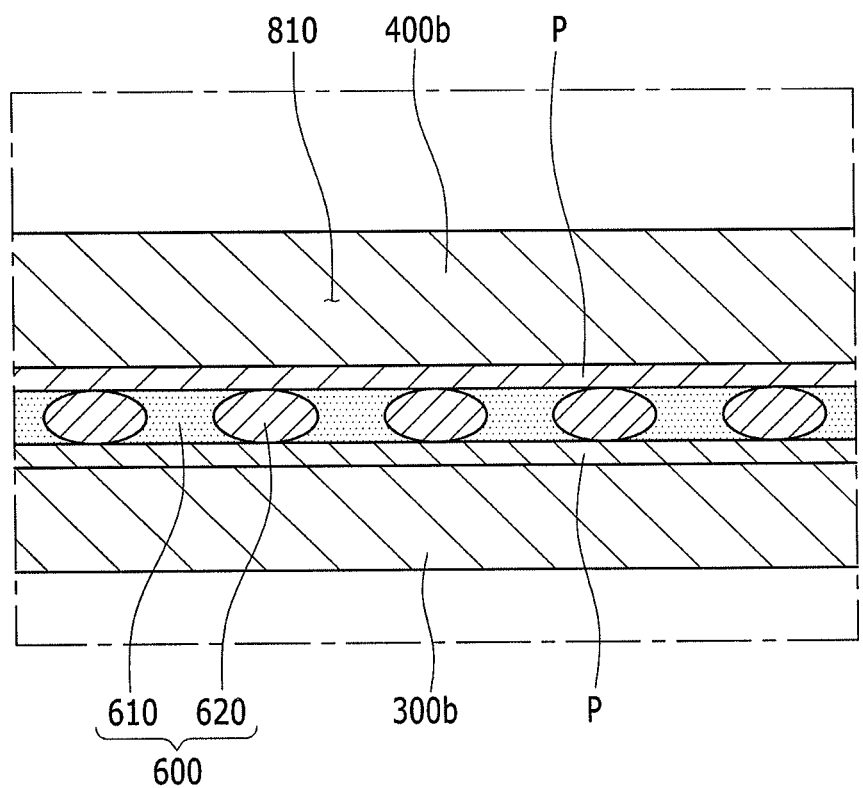
FIG. 4 illustrates a view of a portion B of FIG. 3.

FIG. 4 illustrates a view of a portion B of FIG. 3.

As shown in FIG. 4, the anisotropic conductive film 600 may connect the second end portion of the first flexible printed circuit (FPC) 300 at the rear surface of the case 800 and the second flexible printed circuit (FPC) 400. The anisotropic conductive film 600 may include an adhesive layer 610 and conductive balls 620. The adhesive layer 610 may facilitate adhesion between the first flexible printed circuit (FPC) 300 and the second flexible printed circuit (FPC) 400. The conductive balls 620 may connect a pad P of the first flexible printed circuit (FPC) 300 and a pad P of the second flexible printed circuit (FPC) 400 such that the first flexible printed circuit (FPC) 300 and the second flexible printed circuit (FPC) 400 are electrically connected. The anisotropic conductive film 600 may facilitate connection of the first flexible printed circuit (FPC) 300 and the second flexible printed circuit (FPC) 400 without significantly adding to the thickness of the liquid crystal display (LCD) 1000. For example, the portion of the liquid crystal display (LCD) 1000 at which the first flexible printed circuit (FPC) 300 and the second flexible printed circuit (FPC) 400 are joined may be thinner than what would be realized if soldering was used to join the first flexible printed circuit (FPC) 300 and the second flexible printed circuit (FPC) 400. Accordingly, slimness of the entire liquid crystal display (LCD) 1000 may be realized by using the anisotropic conductive film 600.

Referring back to FIG. 2 and FIG. 3, the mold frame 700 may enclose a side of the liquid crystal display panel 100 and the backlight unit 200 and may support the liquid crystal display panel 100 and the backlight unit 200.

The case 800 may receive at least a portion of the liquid crystal display panel 100, the backlight unit 200, and the mold frame 700. The case 800 may prevent damage to the liquid crystal display panel 100 and the backlight unit 200 by an external force.

The case 800 and the mold frame 700 may enclose the side of the liquid crystal display panel 100 and the backlight unit 200, when the liquid crystal display (LCD) 1000 is assembled as one module.

The case 800 may include the recess portion 810 that retains a portion of the second flexible printed circuit (FPC) 400. The recess portion 810 may include a recess or groove within a rear surface of the case 800. The second flexible printed circuit (FPC) 400 may be positioned in the recess portion 810. As such, protrusion of the second flexible printed circuit (FPC) 400 outside the case 800 may be prevented or minimized. The anisotropic conductive film 600 may also be in the recess portion 810. As such, protrusion of the anisotropic conductive film 600 outside the case 800 may be prevented. Accordingly, the slimness of the entire liquid crystal display (LCD) 1000 may be realized.

As described above, in the liquid crystal display (LCD) 1000 according to an exemplary embodiment, the first flexible printed circuit (FPC) 300 and the second flexible printed circuit (FPC) 400 may be connected by the anisotropic conductive film 600, such that the portion at which the first flexible printed circuit (FPC) 300 and the second flexible printed circuit (FPC) 400 are connected is thinner than what can be achieved with the soldering. Accordingly, slimness of the entire liquid crystal display (LCD) 1000 may be realized.

Also, in the liquid crystal display (LCD) 1000 according to an exemplary embodiment, the recess portion 810 is formed at a position corresponding to the position of a portion of the second flexible printed circuit (FPC) 400 to prevent protrusion of the second flexible printed circuit (FPC) 400 outside the case 800, and to facilitate achieving a slim liquid crystal display (LCD) 1000.

Also, in the liquid crystal display (LCD) 1000 according to an exemplary embodiment, the second flexible printed circuit (FPC) 400 and the anisotropic conductive film 600 may both be positioned in the recess portion 810 such that protrusion of the second flexible printed circuit (FPC) 400 and the anisotropic conductive film 600 outside of the case 800 is prevented, and slimness of the entire liquid crystal display (LCD) 1000 may, thereby, be realized.

By way of summation and review, in a conventional liquid crystal display, a flexible printed circuit (FPC) is connected to a main flexible printed circuit through soldering. The soldering, however, may increase the thickness of the liquid crystal display.

In contrast, in the liquid crystal display (LCD) 1000 according to an exemplary embodiment, the first flexible printed circuit (FPC) 300 and the second flexible printed circuit (FPC) 400 may be connected by the anisotropic conductive film 600, such that the resulting liquid crystal display may be thinner than that achieved by soldering. In addition, generation of an undesired short between the first flexible printed circuit (FPC) 300 and the second flexible printed circuit (FPC) 400 may, thereby, be prevented.

While this disclosure has been described in connection with what is presently considered to be practical exemplary embodiments, it is to be understood that the embodiments are not limited to the disclosed embodiments, but, on the contrary, is intended to cover various modifications and equivalent arrangements included within the spirit and scope of the appended claims.

What is claimed is:

1. A liquid crystal display, comprising:
a liquid crystal display panel;
a backlight unit irradiating light to the liquid crystal display panel, the backlight unit including a light emitting diode;
a first flexible printed circuit having a first end portion and a second end portion, and a bent portion between the first end portion and the second end portion, the first end portion of the first flexible printed circuit being connected to the liquid crystal display panel, the first flexible printed circuit driving the liquid crystal display panel and the light emitting diode;
a second flexible printed circuit having a first end portion and a second end portion, and a bent portion extending between the first end portion and the second end portion, the first end portion of the second flexible printed circuit being coupled with the light emitting diode and the second end portion of the second flexible printed circuit being connected to the first flexible printed circuit;
an anisotropic conductive film connecting the first flexible printed circuit and the second flexible printed circuit; and
a case receiving at least a portion of the backlight unit and the liquid crystal display panel, the case including a rear surface having a recess portion, an endmost portion of the second end portion of the second flexible printed circuit where the second flexible printed circuit is connected to the first flexible printed circuit by the anisotropic conductive film being positioned within the recess portion,
wherein the first end portion of the second flexible printed circuit is not within an interior of the recess portion, and
wherein the bent portion of the second flexible printed circuit extends outside an outermost surface of the case.

2. The liquid crystal display as claimed in claim 1, wherein the endmost portion of the second end portion of the second flexible printed circuit is positioned within an interior of the recess portion and positioned between the rear surface of the case and the first flexible printed circuit.

3. The liquid crystal display as claimed in claim 2, wherein a full extent of the anisotropic conductive film is positioned between the second end portion of the first flexible printed circuit and the second end portion of the second flexible printed circuit.

4. The liquid crystal display as claimed in claim 1, wherein the anisotropic conductive film and the second end portion of the second flexible printed circuit are positioned within an interior of the recess portion.

5. The liquid crystal display as claimed in claim 1, wherein the first flexible printed circuit and the second flexible printed circuit each include a flexible insulating film and a complex circuit formed on the flexible insulating film.

6. The liquid crystal display as claimed in claim 5, wherein the flexible insulating film includes a heat resistant plastic film.

7. The liquid crystal display as claimed in claim 6, wherein the heat resistant plastic film includes polyethylene terephthalate or polyimide.

8. The liquid crystal display as claimed in claim 1, wherein the first flexible printed circuit includes driving circuits for driving the liquid crystal display panel and driving circuits for driving the light emitting diodes.

9. The liquid crystal display as claimed in claim 8, wherein the driving circuits for driving the liquid crystal display panel include at least one of a gate driving circuit, a data driving circuit, and a timing controller.

10. A liquid crystal display, comprising:
a liquid crystal display panel;
a backlight unit irradiating light to the liquid crystal display panel, the backlight unit including a light emitting diode;
a first flexible printed circuit having a first end portion and a second end portion, and a bent portion between the first end portion and the second end portion, the first end portion of the first flexible printed circuit being connected to the liquid crystal display panel, the first flexible printed circuit driving the liquid crystal display panel and the light emitting diode;
a second flexible printed circuit having a first end portion and a second end portion, and a bent portion extending between the first end portion and the second end portion, the first end portion of the second flexible printed circuit being coupled with the light emitting diode and the second end portion of the second flexible printed circuit being connected to the first flexible printed circuit;
an anisotropic conductive film connecting the first flexible printed circuit and the second flexible printed circuit; and
a case receiving at least a portion of the backlight unit and the liquid crystal display panel, the case including a rear surface having a recess portion, an endmost portion of the second end portion of the second flexible printed circuit where the second flexible printed circuit is connected to the first flexible printed circuit by the anisotropic conductive film being positioned within the recess portion,
wherein the first flexible printed circuit extends along an entire length of the liquid crystal display, and
wherein the bent portion of the second flexible printed circuit extends outside an outermost surface of the case.

11. A liquid crystal display, comprising:
a liquid crystal display panel;
a backlight unit irradiating light to the liquid crystal display panel, the backlight unit including a light emitting diode;
a first flexible printed circuit having a first end portion and a second end portion, and a bent portion between the first end portion and the second end portion, the first end portion of the first flexible printed circuit being connected to the liquid crystal display panel, the first flexible printed circuit driving the liquid crystal display panel and the light emitting diode;
a second flexible printed circuit having a first end portion and a second end portion, and a bent portion extending between the first end portion and the second end portion, the first end portion of the second flexible printed circuit being coupled with the light emitting diode and the second end portion of the second flexible printed circuit being connected to the first flexible printed circuit;
an anisotropic conductive film connecting the first flexible printed circuit and the second flexible printed circuit; and
a case receiving at least a portion of the backlight unit and the liquid crystal display panel, the case including a rear surface having a recess portion, an endmost portion of the second end portion of the second flexible printed circuit where the second flexible printed circuit is connected to the first flexible printed circuit by the anisotropic conductive film being positioned within the recess portion, and a front surface having another recess portion, the recess portions of the front and rear surfaces of the case being aligned with one another, the bent portion of the second flexible printed circuit extending from the recess in the front surface of the case to the recess in the rear surface of the case outside an outermost surface of the case.

12. The liquid crystal display as claimed in claim 10, wherein:
the endmost portion of the second end portion of the second flexible printed circuit is positioned within an interior of the recess portion and positioned between the rear surface of the case and the first flexible printed circuit; and
a full extent of the anisotropic conductive film is positioned between the second end portion of the first flexible printed circuit and the second end portion of the second flexible printed circuit.

* * * * *